US012676394B2

(12) United States Patent
Munemoto

(10) Patent No.: US 12,676,394 B2
(45) Date of Patent: Jul. 7, 2026

(54) PILLBOX WAVEGUIDE HAVING FIRST AND SECOND WELDING COLLARS AND WHICH IS MANUFACTURED USING A ROTATION REGULATION JIG

(71) Applicant: CANON ELECTRON TUBES & DEVICES CO., LTD., Otawara (JP)

(72) Inventor: Naoya Munemoto, Nasushiobara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 111 days.

(21) Appl. No.: 18/666,903

(22) Filed: May 17, 2024

(65) Prior Publication Data

US 2024/0304966 A1 Sep. 12, 2024

Related U.S. Application Data

(63) Continuation of application No. PCT/JP2021/043396, filed on Nov. 26, 2021.

(51) Int. Cl.
*H01P 1/08* (2006.01)
*H01P 11/00* (2006.01)

(52) U.S. Cl.
CPC .............. *H01P 1/08* (2013.01); *H01P 11/002* (2013.01)

(58) Field of Classification Search
CPC .......................................................... H01P 1/08
USPC .......................................................... 333/252
See application file for complete search history.

(56) References Cited

U.S. PATENT DOCUMENTS 2,881,401 A * 4/1959 Bondley .................... H01P 1/08 315/39
3,179,213 A * 4/1965 Kuehne et al. ........... H01P 1/08 403/30
3,675,165 A * 7/1972 Ueda et al. ............... H01P 1/08 333/252
5,532,462 A 7/1996 Butwell et al.
7,012,386 B1 * 3/2006 Berg et al. ................ H01P 1/08 315/505

(Continued)

FOREIGN PATENT DOCUMENTS

CN 108242581 A 7/2018
CN 113422178 A 9/2021

(Continued)

OTHER PUBLICATIONS

International Search Report issued Feb. 15, 2022 in PCT/JP2021/043396 filed on Nov. 26, 2021, 2 pages.

(Continued)

*Primary Examiner* — Benny T Lee
(74) *Attorney, Agent, or Firm* — Oblon, McClelland, Maier & Neustadt, L.L.P.

(57) ABSTRACT

According to one embodiment, an introduction-side rectangular waveguide tube and a lead-out-side rectangular waveguide tube are each connected to a circular connection plate connected to an end surface of the circular waveguide tube, and at least one connection plate includes, in an outer circumference thereof, the other welding collar welded to the one welding collar, and both the one welding collar and the other welding collar include grooves or holes for a rotation regulation jig to regulate rotation in a circumferential direction, and an entire portion along the circumferential direction including the grooves or holes is welded and fixed thereto.

2 Claims, 13 Drawing Sheets

(56) References Cited

U.S. PATENT DOCUMENTS

| | | | |
|---|---|---|---|
| 2020/0020999 A1 | 1/2020 | Kasahara et al. | |

FOREIGN PATENT DOCUMENTS

| | | | |
|---|---|---|---|
| JP | 51-5336 | U | 1/1976 |
| JP | 1-101001 | A | 4/1989 |
| JP | 2-144828 | A | 6/1990 |
| JP | 7-321501 | A | 12/1995 |

OTHER PUBLICATIONS

Extended European Search Report issued Sep. 15, 2025 in European Patent Application No. 21965655.0, 7 pages.

* cited by examiner

PILLBOX WAVEGUIDE HAVING FIRST AND SECOND WELDING COLLARS AND WHICH IS MANUFACTURED USING A ROTATION REGULATION JIG

CROSS-REFERENCE TO RELATED APPLICATIONS

This application is a Continuation Application of PCT Application No. PCT/JP2021/043396, filed Nov. 26, 2021, the entire contents of which are incorporated herein by reference.

FIELD

Embodiments described herein relate generally to a pillbox window and a method for manufacturing a pillbox window.

BACKGROUND

Pillbox windows are known as elemental components that separate between the vacuum and the external atmosphere, a gas and the vacuum in input couplers that introduce high-power high-frequency power to an accelerating cavity maintained in the vacuum, and in output circuits that extract high-frequency power from power tubes, a typical example of which is a klystron.

A pillbox window has a rectangular waveguide tube on the introduction side from the high-frequency source (RF source), a circular waveguide tube, and a rectangular waveguide tube on the lead-out side. The circular waveguide tube has a dielectric hermetic window (ceramic window) in an inner space thereof, and the dielectric hermetic window compartmentalizes the introduction side and the lead-out side from each other.

As to pillbox windows, a sealing structure which uses a collar and a gasket is known as a sealing structure for each waveguide tube.

On the other hand, as other sealing structures for waveguide tubes in pillbox windows, there is a sealing structure made by tungsten inert gas (Tig) welding.

In this welding process, waveguide tubes to be welded together are each provided with a welding collar, and the welding collars are fixed to each other by Tig welding. Here, the welding is carried out by measuring and controlling the high-frequency transmission ratio (VSWR) so as to level the welding collars with each other using a measurement instrument such as a level and not to displace the welding collars from each other as the welding collars rotate in the circumferential direction.

But, here, the measurement effort needed with each measurement instrument is laborsome and time-consuming, and the measurement varies, which adversely affects the electrical characteristics of the electron tubes and accelerator tubes in which the pillbox windows are installed.

The embodiment has been proposed in light of the points discussed above, and an object thereof is to provide a pillbox window that can prevent adverse effects on electrical characteristics and also can be easily assembled.

DETAILED DESCRIPTION OF THE DISCLOSURE

Figure 1:
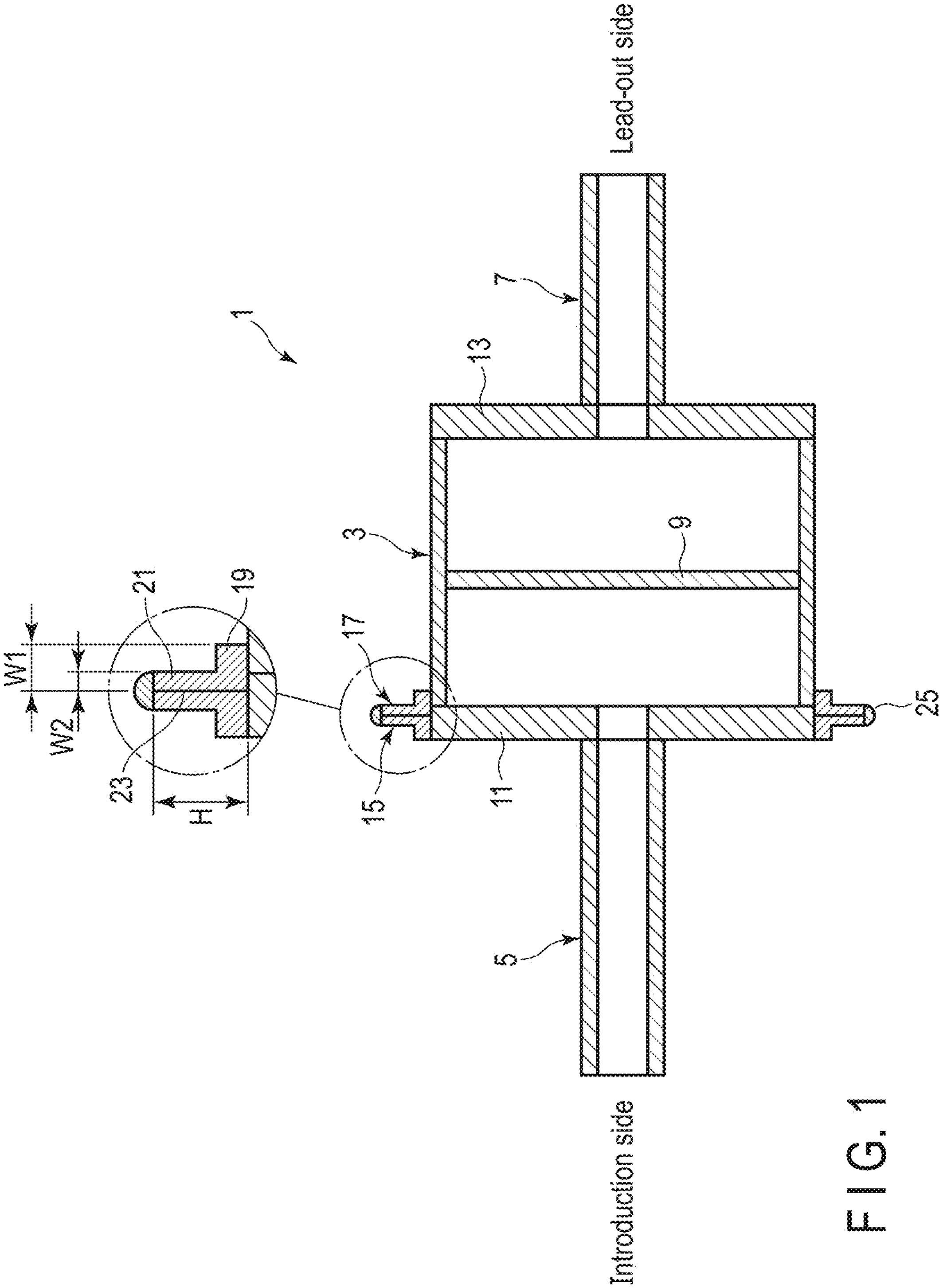
FIG. 1 is a cross-sectional view showing a pillbox window according to the first embodiment.

In general, according to one embodiment, a pillbox window comprises a cylindrically shaped circular waveguide tube, a rectangular cylindrically shaped introduction-side waveguide tube provided at one end of the circular waveguide tube to introduce high-frequency waves from a high frequency source, and a rectangular shaped lead-out-side waveguide tube provided at an other end of the circular waveguide tube to lead out high frequency waves, and the circular waveguide tube includes a dielectric hermetic window, and one welding collar on an outer circumference of an end surface of at least one of an introduction-side and a lead-out side, which compartmentalizes an inner space into the introduction-side and the lead-out side, the introduction-side rectangular waveguide tube and the lead-out-side rectangular waveguide tube are each connected to a circular connection plate connected to an end surface of the circular waveguide tube, and at least one connection plate includes, in an outer circumference thereof, the other welding collar welded to the one welding collar, and both the one welding collar and the other welding collar comprise grooves or holes for a rotation regulation jig which regulates rotation in a circumferential direction, and an entire portion along the circumferential direction including the grooves or holes is welded and fixed thereto.

According to another embodiment, there is provided a method of manufacturing the pillbox window, wherein the rotation regulation jig including a fitting projection portion that fits into the holes or the grooves of the one welding collar and the other welding collar, and the method comprises a rotation regulation step of fitting the fitting projection portion into the one welding collar and the other welding collar before welding and fixing the one welding collar and the other welding collar together, thereby relatively regulating rotation thereof in a circumferential direction, a torque application step of fastening the one welding collar and the other welding collar at a predetermined torque with a torque application jig, a first welding step of welding portions of the one welding collar and the other welding collar excluding the holes or the grooves after the rotation regulation step and the torque application step, a jig removal step of removing the rotation regulation jig and the torque application jig before the first welding step, and a second welding step of welding portions of the holes or the grooves of the one welding collar and the other welding collar after the jig removal step.

One embodiment will now be described in detail with reference to the accompanying drawings. Note that the drawings may be represented schematically in terms of width, thickness, shape, etc., of each part compared to those of the actual mode in order to make the explanation clearer, but this is only an example and does not limit the interpretation of the invention. In addition, in this specification and in each figure, components that perform the same or similar functions as those described above with respect to the figures already mentioned are marked with the same reference symbols, and repetitions of detailed explanations may be omitted as appropriate.

First, the first embodiment will be described with reference to FIGS. 1 to 9 and FIG. 11.

As shown in FIG. 1, a pillbox window 1 according to the first embodiment comprises a cylindrical circular waveguide tube 3, an introduction-side rectangular waveguide tube 5 that introduces high-frequency waves from a high-frequency wave source, and a lead-out-side rectangular waveguide tube 7 that leads out the high-frequency waves.

The circular waveguide tube 3 is cylindrical in shape and a circular dielectric hermetic window (ceramic window) 9 is connected to the inside of the cylinder. The dielectric hermetic window 9 is configured to transmit a predetermined high-frequency wave and compartmentalizes the inner space of the circular waveguide tube 3 into an introduction side and a lead-out side.

The circular waveguide tube 3 may be of a type which includes a circular waveguide tube and an additional structure such as a cooling structure to the circular waveguide tube.

To an end of the introduction side of the circular waveguide tube 3, a circular introduction-side connection plate 11 is connected, whereas a circular lead-out-side connection plate 13 is connected to an end of the lead-out-side of the circular waveguide tube 3.

To a center of the introduction-side connection plate 11, the introduction-side rectangular waveguide tube 5 is connected, whereas the lead-out-side rectangular waveguide tube 7 is connected to a center of the lead-out-side connection plate 13.

One ring-shaped welding collar 15 is connected to an outer circumference of the introduction-side connection plate 11, and another ring-shaped welding collar 17 is connected to an outer circumference of an end of the introduction side of the circular waveguide tube 3.

Figure 4:
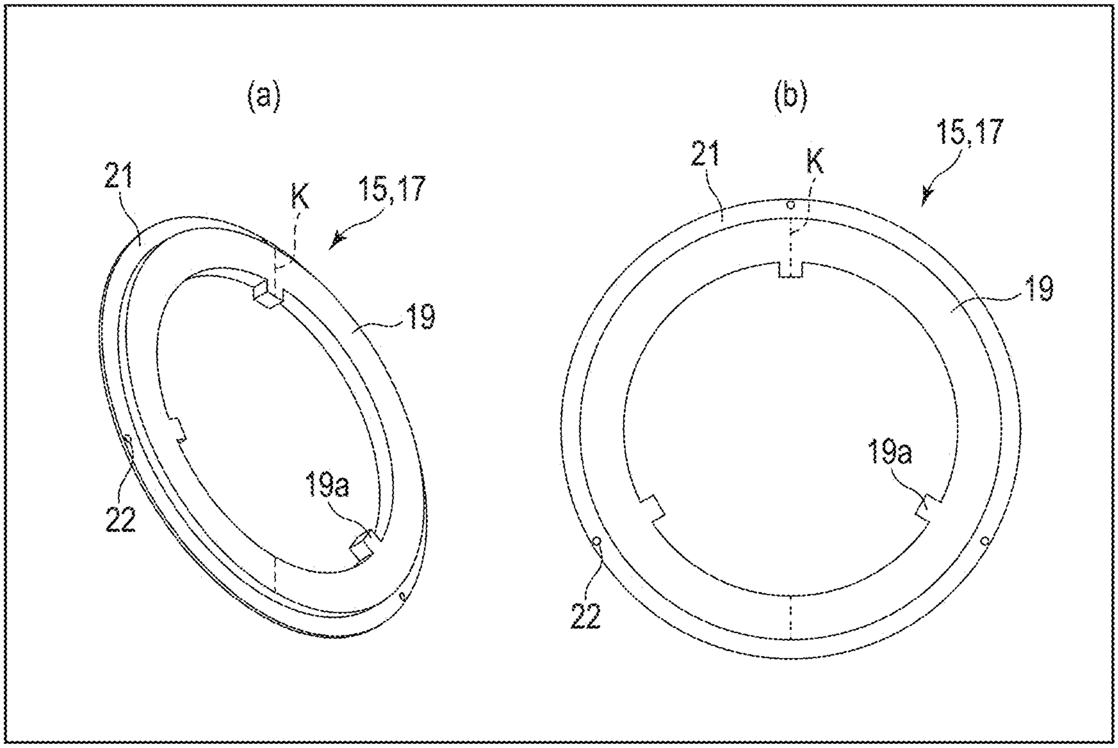
FIG. 4 is a diagram showing one and the other one of the welding collars shown in FIG. 1, part (a) being a perspective view and part (b) being a front view.

As shown in FIGS. 1 and 4, the one welding collar 15 and the other welding collar 17 are configured to include parts to be welded, which have a similar structural shape and they are of the same type. Each of the welding collars 15 and 17 is made of a metal such as stainless steel plated with nickel (Ni) or the like.

Since the one and the other welding collars 15 and 17 have the same configuration, the following explanation thereof will focus on the one welding collar 15.

Note here that the one welding collar 15 has an inner circumferential-side portion 19 and an outer circumferential-side portion 21, with a thickness W1 of the inner circumferential-side portion 19 (see FIG. 1) being greater than a thickness W2 of the outer circumferential-side portion 21 (see FIG. 1). The inner circumferential-side portion 19 of the one welding collar 15 is connected to the outer circumferential surface of the introduction-side connection plate 11, and the inner circumferential-side portion 19 of the other welding collar 17 is connected to the outer circumferential surface of the circular waveguide tube 3.

As shown in FIG. 4, in the outer circumferential-side portion 21, a plurality of holes 22 are formed so as to be spaced apart from each other along a circumferential direction thereof. In this embodiment, three holes 22 are formed at equal intervals.

Figure 6:
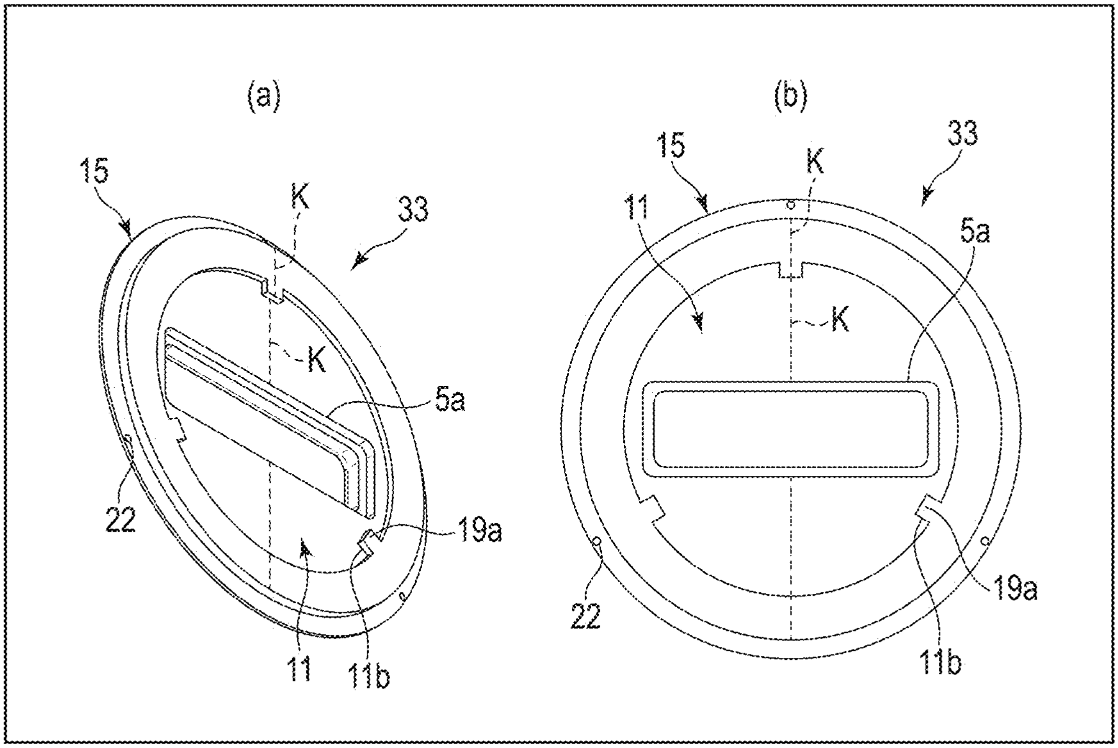
FIG. 6 is a diagram showing one of the welding collars fit in an introduction-side connection plate, part (a) being a perspective view, and part (b) being a front view.

The inner circumferential side portion 19 has a fitting projection portion 19*a* which projects toward the inner circumferential side. As shown in FIG. 6, the projection portion 19*a* is configured to fit into a fitting recess portion 11*b* (see FIG. 11) formed in the introduction-side connection plate 11 for positioning. But without providing the projection portion 19*a* and the fitting recess portion 11*b*, the positioning of the rotational direction may be adjusted only by a mark-off line K, which will be described later.

As shown in FIG. 1, the one welding collar 15 and the other welding collar 17 are arranged to oppose each other, and opposing surfaces 23 thereof are flat and each has a dimension H extending from the inner circumferential-side portion 19 to the outer circumferential-side portion 21.

Note that each of the aforementioned components is connected by using a metal brazing material.

The one welding collar 15 and the other welding collar 17 are butted against each other on the opposing surfaces 23, and the outer circumferential edges are welded and secured by a welding portion 25. The welding is, for example, arc welding.

The welding portion 25 is filled into the holes 22 so as to weld each of the holes 22, as well.

Next, a method of manufacturing the pillbox window 1, according to this embodiment, will be described.

Figure 2:
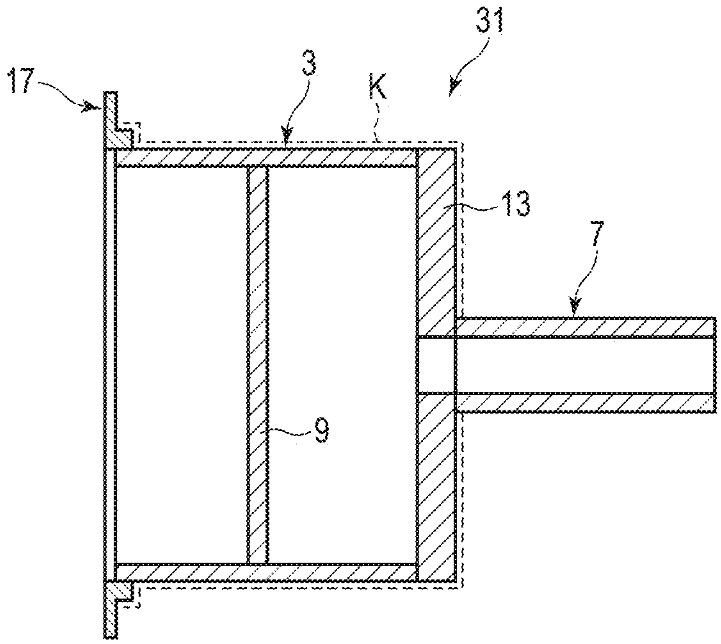
FIG. 2 is a cross-sectional view showing a circular waveguide tube unit shown in FIG. 1.
Figure 3:
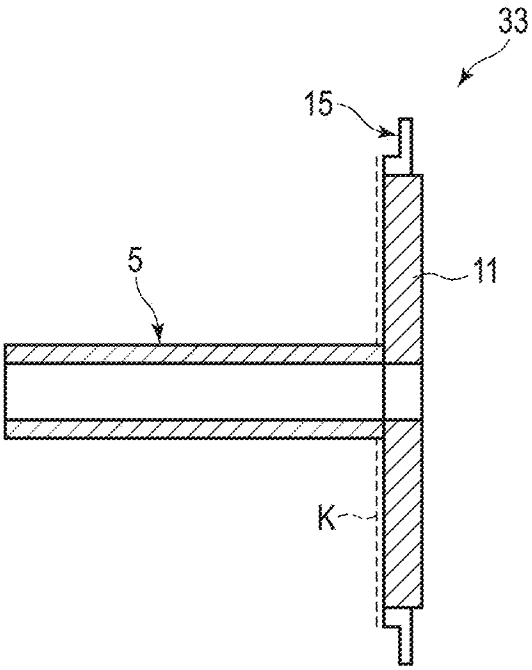
FIG. 3 is a cross-sectional view showing the rectangular waveguide tube unit shown in FIG. 1.

As shown in FIGS. 2 and 3, the pillbox window 1 (shown in FIG. 1) is manufactured by assembling two units 31 and 33, namely, a circular waveguide tube unit 31 (see FIG. 2) and a rectangular waveguide tube unit 33 (see FIG. 3), and then welding and securing these units 31 and 33 together with a welding portion 25 (see FIG. 1).

As shown in FIG. 2, the circular waveguide tube unit 31 is assembled by attaching a dielectric hermetic window 9 to the inner circumferential surface of a cylindrical circular waveguide tube 3, fitting the other welding collar 17 to the outer circumferential surface of the introduction-side end of the circular waveguide tube 3, and attaching an lead-out-side connection plate 13 fit with a lead-out-side rectangular waveguide tube 7 on the lead-out-side of the circular waveguide tube 3.

Figure 7:
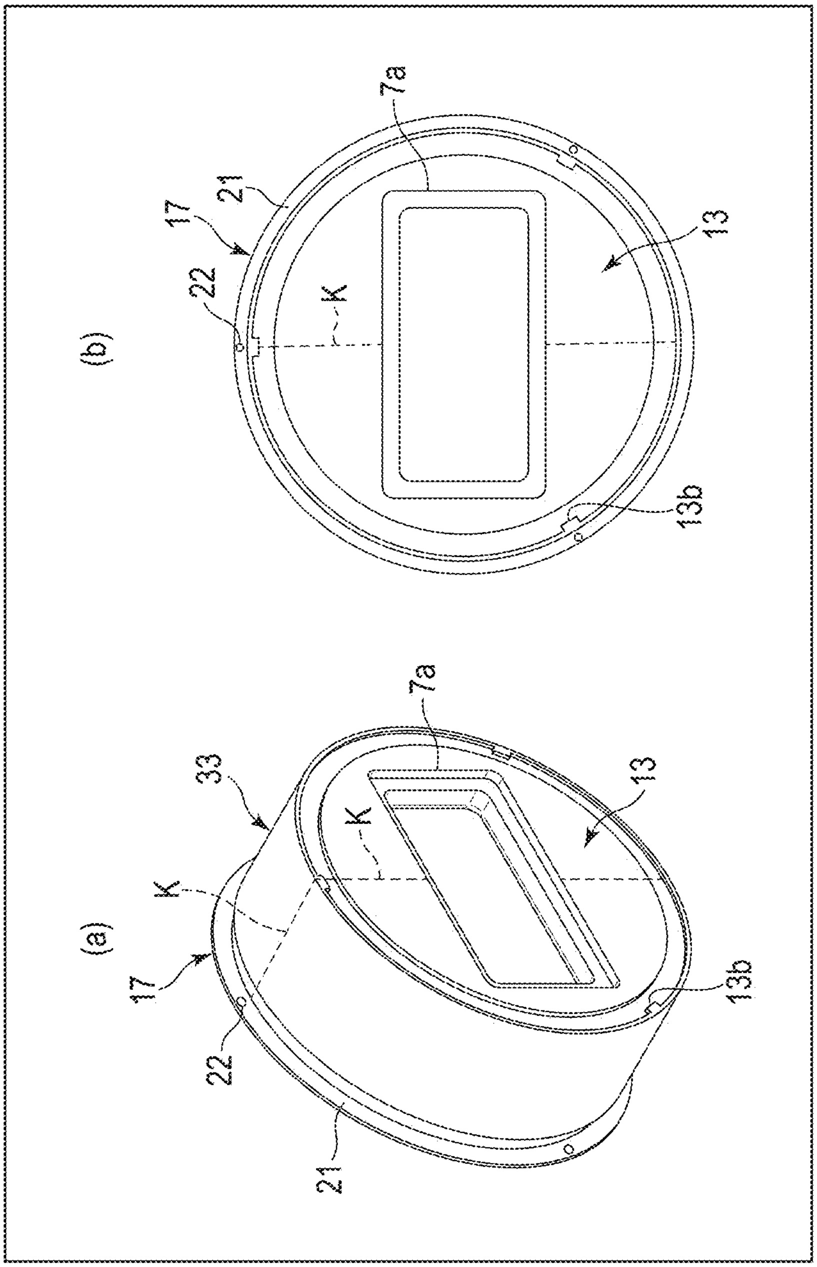
FIG. 7 is a diagram showing the other one of the welding collars and the introduction-side connection plate fit in a circular waveguide tube, part (a) being a perspective view, and part (b) being a rear view.

The fit position between the other welding collar 17 and the lead-out-side connection plate 13 with respect to the circular waveguide tube 3 is as shown in FIG. 7, that is, the positions in the rotational direction are determined based on the machined dimensions of each component by conducting the assembly is performed by at least two mark-off lines K (indicated by dashed lines in the figure) with respect to the fit portion 7*a* of the lead-out-side rectangular waveguide tube 7 (see FIG. 1), or by disposing at least two recess portions (or projection portions) 13*b* (there are three in the figure) so as to correspond to the positions of the holes 22, and then assembling the circular waveguide tube 3 while matching the mark-off lines K of the circular waveguide tube 3, the mark-off lines K of the other welding collar 17, and the mark-off lines K of the lead-out side connection plate with each other.

For the circular waveguide tube unit 31 (see FIG. 2) thus assembled, the installed components are connected with each other by metal brazing.

As shown in FIGS. 3 and 6, the rectangular waveguide tube unit 33 is assembled by fitting one welding collar 15 to the outer circumference of the introduction-side connection plate 11, to which the introduction-side rectangular waveguide tube 5 is fit (, which is omitted from the illustration of FIG. 6). As shown in FIG. 6, the fit position of the one welding collar 15 to the introduction-side connection plate 11 is based on at least two mark-off lines K (shown as dashed lines in FIG. 6) with respect to a fitting portion 5*a* of the introduction-side rectangular waveguide tube 5 for the assembly to be performed, or a fitting recess 11*b* of the introduction-side connection plate 11 and a fitting projection portion 19*a* of the one welding collars 15 are fit each other to carry out the positioning in the rotational direction by the machined dimensions of the components.

For the rectangular waveguide tube unit 33 thus assembled, the installed components are connected to each other by metal brazing.

Next, the circular waveguide tube unit 31 and the rectangular waveguide tube unit 33 are aligned with respect to each other, joined with a predetermined torque, and fixed together by welding. Here, first, a rotation regulation jig 35 and a torque application jig 37 used to perform alignment will be explained.

Figure 5:
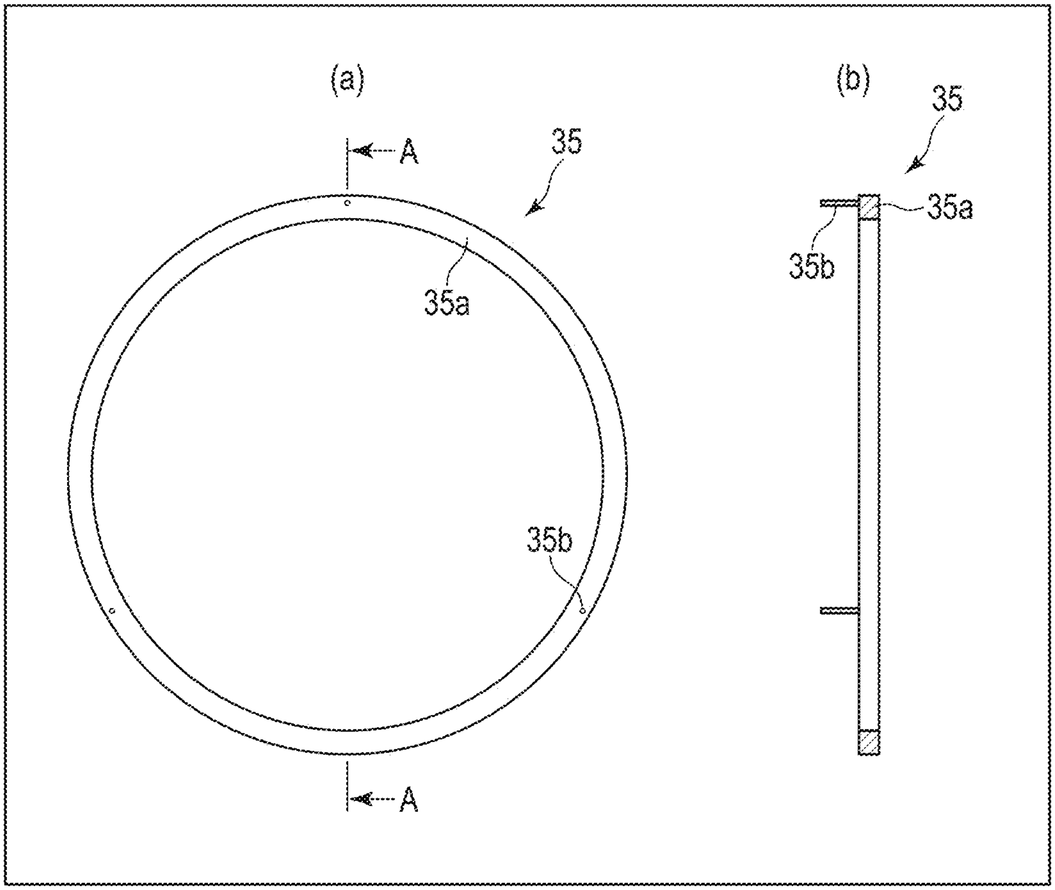
FIG. 5 is a diagram showing a rotation regulation jig according to the first embodiment, part (a) being a front view, and part (b) being a cross-sectional view taken along ling A-A shown in part (a).

As shown in FIG. 5, the rotation regulation jig 35 comprises a ring-shaped jig body 35*a* and a fitting projection portion 35*b*. The jig body 35*a* is formed into such a shape as to overlap the outer circumferential-side portion 21 of the one welding collar 15 (see FIG. 8). The fitting projection portion 35*b* is a pin that fits into the holes 22 (see FIG. 4) formed in the one and the other welding collars 15 and 17, and is formed to project from one surface of the jig body 35*a*.

In this embodiment, there are three fitting projection portions 35*b* provided at three locations equally spaced from each other along the circumferential direction of the jig body 35*a*.

Figure 8:
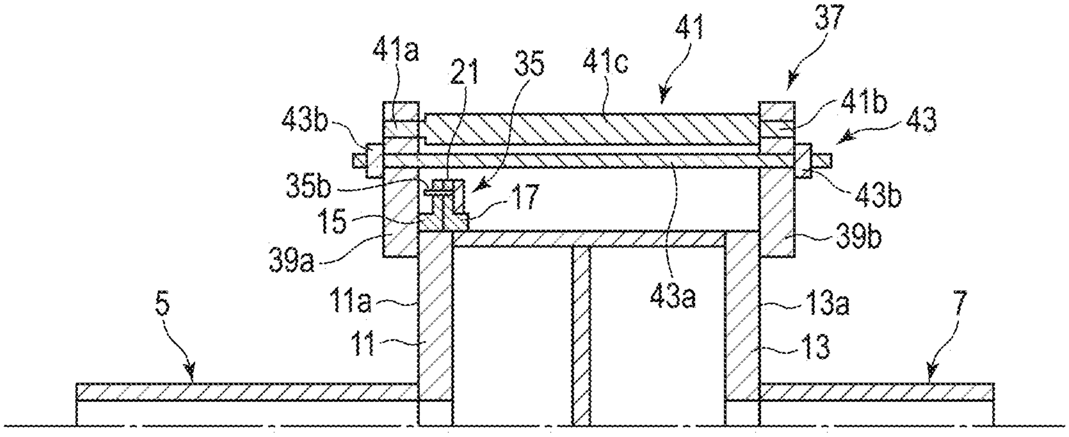
FIG. 8 is a cross-sectional view showing a pillbox window assembly in which the rotation regulation jig of the first embodiment and a torque application jig are installed.

As shown in FIG. 8, the torque application jig 37 is constituted by a pair of clamping bodies 39*a* and 39*b*, a torque regulation member 41, and a fastening tool 43. There are three torque application jigs 37 provided at three locations corresponding to the positions of the fitting projection portions 35*b* of the rotation regulation jig 35.

In the pair of bolding bodies 39*a* and 39*b*, one holding body 39*a* is placed in contact with an introduction-side surface 11*a* of the introduction-side connection plate 11 and the other holding body 39*b* is placed in contact with a lead-out-side surface 13*a* of the lead-out-side connection plate 13.

The torque regulation member 41 has diameters of the introduction-side end portion 41*a* and the lead-out-side end portion 41*b*, which are smaller than the diameter of a middle part 41*c* thereof. The introduction-side end portion 41*a* and the lead-out-side end portion 41*b* are formed to be movably inserted into the corresponding insertion holes of the introduction-side connection plate 11 and the lead-out-side connection plate 13, respectively. With this configuration, it is possible to regulates the torque to be applied not to be excessive as they butt against the middle part 41*c* when the gap between the introduction-side connection plate 11 and the lead-out-side connection plate 13 becomes narrower than a predetermined value.

The fastening tool 43 has a screw shaft 43*a*, which is threaded throughout the shaft, and nuts 43*b*, which are screwed onto each end of the screw shaft 43*a*, and both end portions of the screw shaft 43*a* are inserted into the introduction-side connection plate 11 and the lead-out-side connection plate 13, respectively.

Then, the torque application jig 37 applies a predetermined torque by tightening the nut 43*b*.

Next, the alignment between the circular waveguide tube unit 31 (see FIG. 2) and the rectangular waveguide tube unit 33 (see FIG. 3) will be explained.

As shown in FIG. 8, the other welding collar 17 (see FIG. 2) fixed to the circular waveguide tube unit 31 and the one welding collar 15 (see FIG. 3) fixed to the rectangular waveguide tube unit 33 are butted against each other to coincide the holes 22 (see FIG. 4) of the welding collar 15 and 17 with respect to each other, and the fitting projection portion 35*b* of the rotation regulation jig 35 is fit into the holes 22 of both of the welding collars 15 and 17. In this manner, the rotation of the one welding collar 15 of the circular waveguide tube unit 31 and the other welding collar 17 of the rectangular waveguide tube unit 33 is regulated (rotation regulation process).

Thereafter, one holding body 39*a* is butted against the introduction side 11*a* of the introduction-side connection plate 11 and the other holding body 39*b* is butted against the lead-out-side 13*a* of the lead-out-side connection plate 13. Here, the torque regulation member 41 and the screw shaft 43*a* are inserted between the one holding body 39*a* and the other holding body 39*b*.

Next, the screw shaft 43*a* is tightened with the nut 43*b* to butt the one welding collar 15 and the other welding collar 17 to each other with a predetermined torque (torque application process).

Then, the outer circumferential side portions 21 of the one welding collar 15 and the other welding collar 17, excluding the holes 22, are fixed by welding (first welding process).

Next, the nut 43*b* is loosened to remove the torque application jig 37 and the rotation regulation jig 35 is removed (jig removal process).

After that step, the holes 22 (see FIG. 4) and the surroundings of the holes of the one welding collar 15 and the other welding collar 17 are welded (second welding process). Note here that welding rods of the same diameter are inserted into the holes 22 for welding.

Operational effects of the first embodiment will now be described.

According to the first embodiment, one welding collar 15 and the other welding collar 17 are welded in the state where the rotation in the circumferential direction is restricted by the rotation regulation jig 35 (see FIG. 5) that fits into the holes 22. With this configuration, it is possible to prevent the shifting of the phase in the rotational direction during the welding.

Further, after removing the rotation regulating jig 35, the parts of the holes 22 of the one welding collar 15 and the other welding collar 17 are welded together, and thus it is possible to reliably perform vacuum sealing over the entire circumference of each of the one welding collar 15 and the other welding collar 17.

Furthermore, the rotation displacement is prevented by the rotation regulation jig 35 and the pillbox window 1 can be manufactured with a predetermined torque by the torque application jig 37, and therefore adverse effects on electrical characteristics can be prevented and the assembly can be simplified.

The pillbox window 1 (see FIG. 1) can prevent the rotation angle (misalignment) θ (see FIG. 14) of the lead-out-side rectangular waveguide tube 7 with respect to the introduction-side rectangular waveguide tube 5, and the rotation angle (misalignment) θ can be limited to 1° or less.

Figure 9:
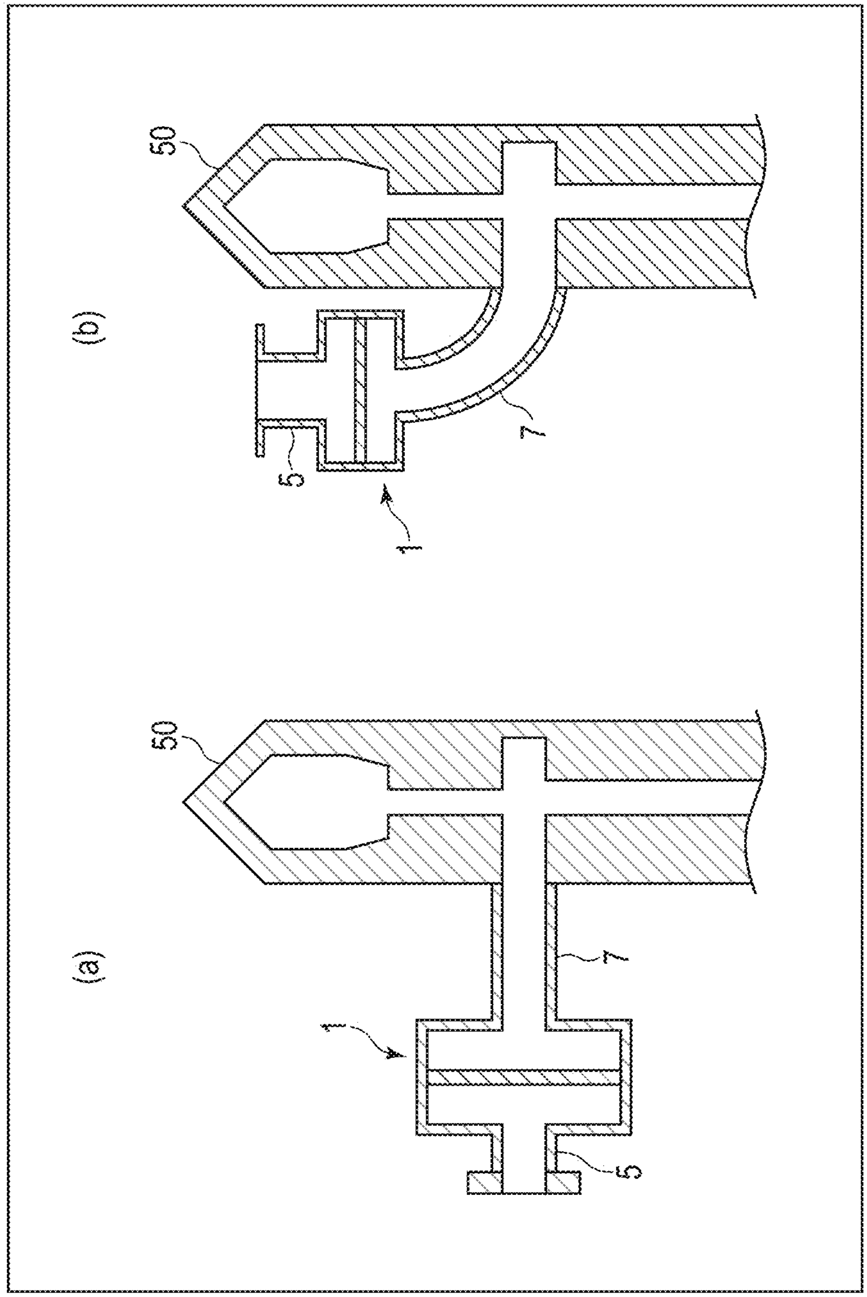
FIG. 9 is a diagram showing an example of application of a pillbox window, part (a) being a cross-sectional view showing an assembly example in which the pillbox window is installed in just front of a cavity, and part (b) being a cross-sectional view showing an assembly example in which the pillbox window is installed in a vertical direction of the cavity.

That is, as shown in FIG. 9, part (a), the pillbox window 1 (see FIG. 1) may be installed horizontally with respect to the cavity 50 or vertically with respect to the cavity 50 as shown in FIG. 9, part (b). In the case where the pillbox window is horizontally installed as shown in FIG. 9, part (a), the assembly is carried out by managing the introduction-side rectangular waveguide tube 5 and the lead-out-side rectangular waveguide tube 7 so as to be set parallel with each other. In the case where vertically installed as shown in FIG. 9, part (b), measurement with a level or the like cannot be carried out, and the installation is done by visual inspection only. In such cases, the assembly and installation are done while measuring and controlling the high-frequency transmission ratio (VSWR), and conventionally, assembly and installation have been laborsome and time-consuming. However, according to the pillbox window of the present invention, the cause of the error in the rotational direction of the introduction-side rectangular waveguide tube and the lead-out-side rectangular waveguide tube can be limited only to the error in the diameter between the holes of the welding collar and the pin of the jig body, and the tolerance of the parts or the tolerance of the mark-off lines. Thus, the installation misalignment in the rotational direction (error) θ can be reliably limited to 1° or less. In this manner, the variation of the high-frequency transmission ratio (VSWR) can be suppressed to within ±0.01 of the designed value, thereby making it possible to stabilize the quality of the cavity 50 to which the pillbox window is connected.

Here, with reference to FIGS. 14 to 17, the relationship between the misalignment angle (rotation angle) θ between the introduction-side rectangular waveguide tube 5 and the lead-out-side rectangular waveguide tube 7 and the variation of the high-frequency transmission ratio (VSWR) will now be explained.

Figure 14:
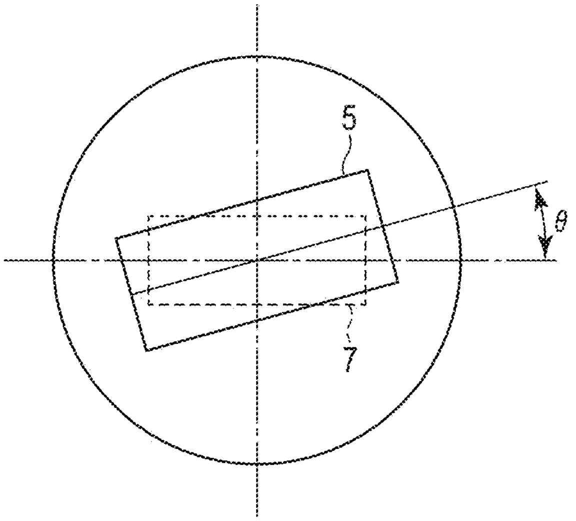
FIG. 14 is a diagram showing an angle of rotation of the introduction side relative to the lead-out side in the pillbox window.

FIG. 14 shows the misalignment angle θ in the rotational direction between the introduction-side rectangular waveguide tube 5 and the lead-out-side rectangular waveguide tube 7.

Figure 15:
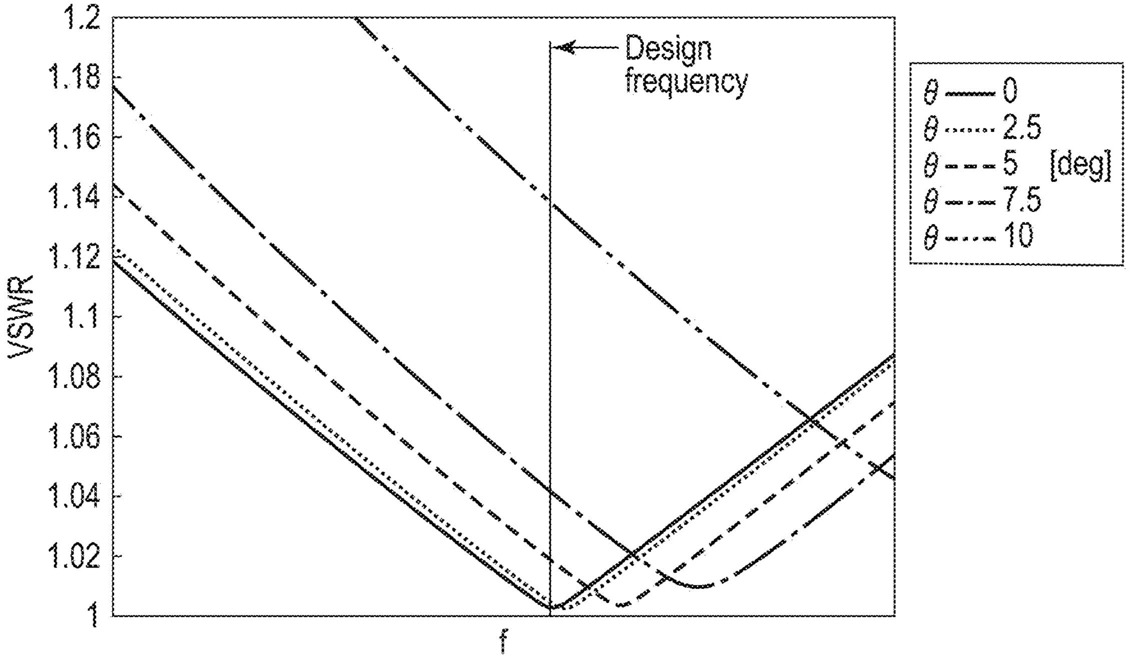
FIG. 15 is a graph showing a relationship between frequency f and VSWR with respect to a design frequency for each rotation angle.
Figure 16:
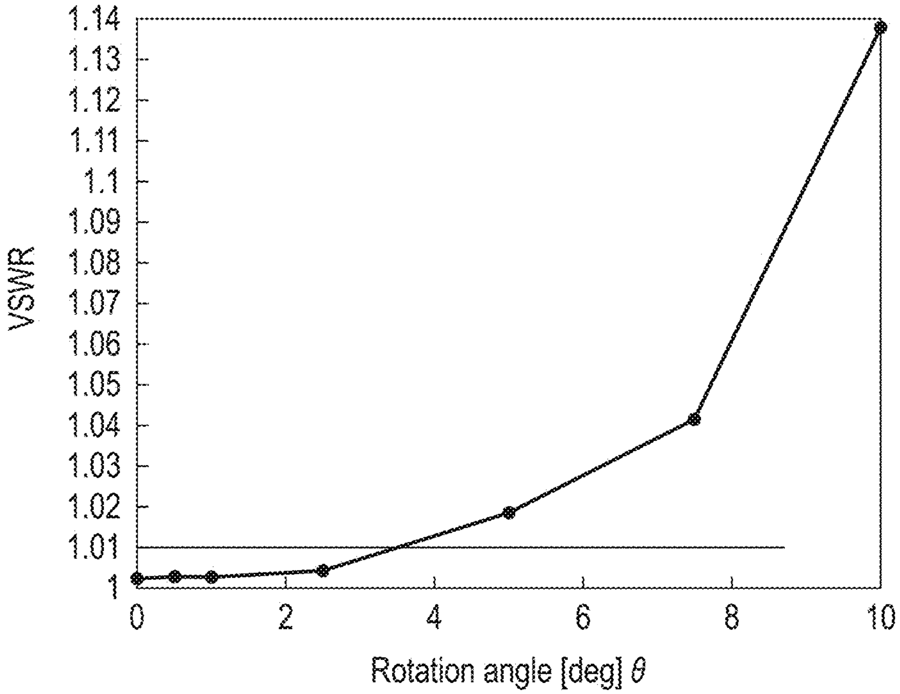
FIG. 16 is a graph showing the relationship between the rotation angle and VSWR.

FIG. 15 shows simulation results of the frequency dependency of VSWR at each of rotational positions when the misalignment angle θ is 0, when θ is 2.5°, when θ is 5°, when θ is 7.5°, and when θ is 10°. In FIG. 15, the horizontal axis represents a frequency f and the vertical axis represents VSWR, and this figure graph shows the installation angle dependency of VSWR on the design frequency. In FIG. 16, the horizontal axis represents the misalignment angle (rotation angle in degrees) θ and the vertical axis represents VSWR, and each VSWR is plotted at the design frequency shown in FIG. 15.

From FIG. 15 and FIG. 16, it can be understood that as the misalignment angle (rotation angle) θ increases, accordingly, the VSWR fluctuates significantly from 1, which is the referential value.

Figure 17:
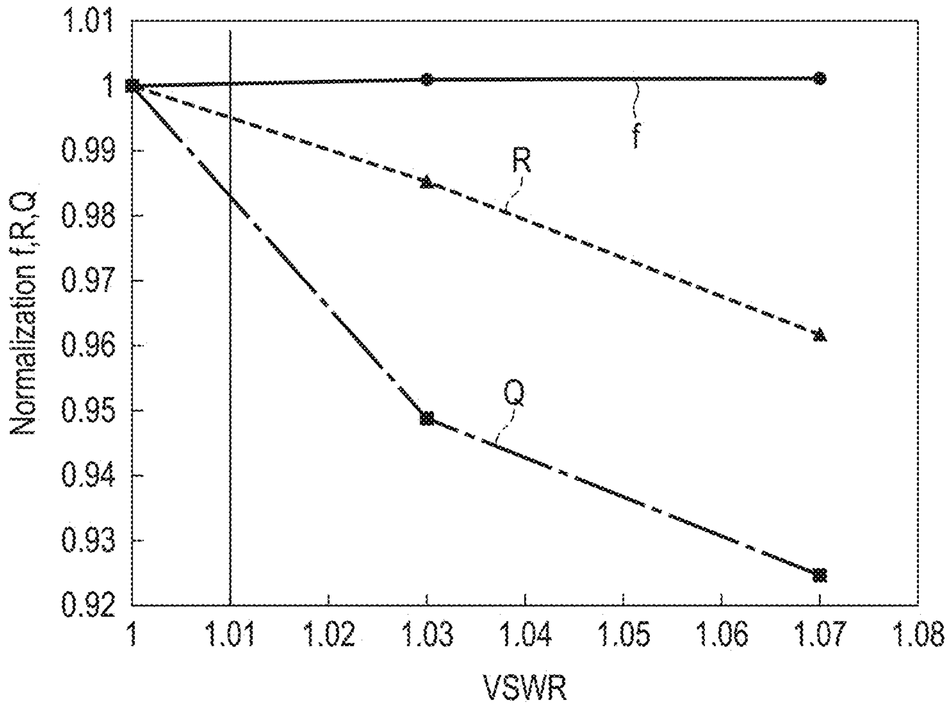
FIG. 17 is a graph showing a relationship between VSWR and cavity parameter characteristics (f, R, Q) for cavities of the identical shape.

FIG. 17 shows a graph of the normalized Q value (quality value) of the cavity parameters, the normalized shunt impedance R, and the normalized resonance frequency f when the geometrical structure of the cavity 50 (see FIG. 9) is kept constant and the VSWR of the dielectric hermetic window (RF window) 9 (see FIG. 1) is shaken, each with VSWR=1, are normalized to 1. The VSWR is taken on the horizontal axis, and the relative ratios of the f, R, and Q are taken on the vertical axis.

From these results, it can be confirmed that the VSWR of the pillbox window 1 (see FIG. 1) varies depending on the mounting angle (misalignment angle) e in the rotational direction of the lead-out side rectangular waveguide tube 7 with respect to the introduction-side rectangular waveguide tube 5, and as shown in FIG. 17, the variation in VSWR of the pillbox window can significantly affect the Q value and shunt impedance R of the cavity 50, which is problematic.

Therefore, according to the pillbox window 1 in this embodiment, the misalignment angle θ can be suppressed within 1°, and therefore the variation of VSWR caused by the misalignment angle θ in the rotational direction can be restricted within ±0.01 and the assembly can be finished within a certain quality without taking time.

Now, another embodiment will be described. In the embodiment described below, parts that exhibit the same operational effects as those of the first embodiment described above will be marked with the same reference symbols, and detailed descriptions of those parts will be omitted.

The second embodiment will be explained with reference to FIGS. 10 to 13.

Figure 10:
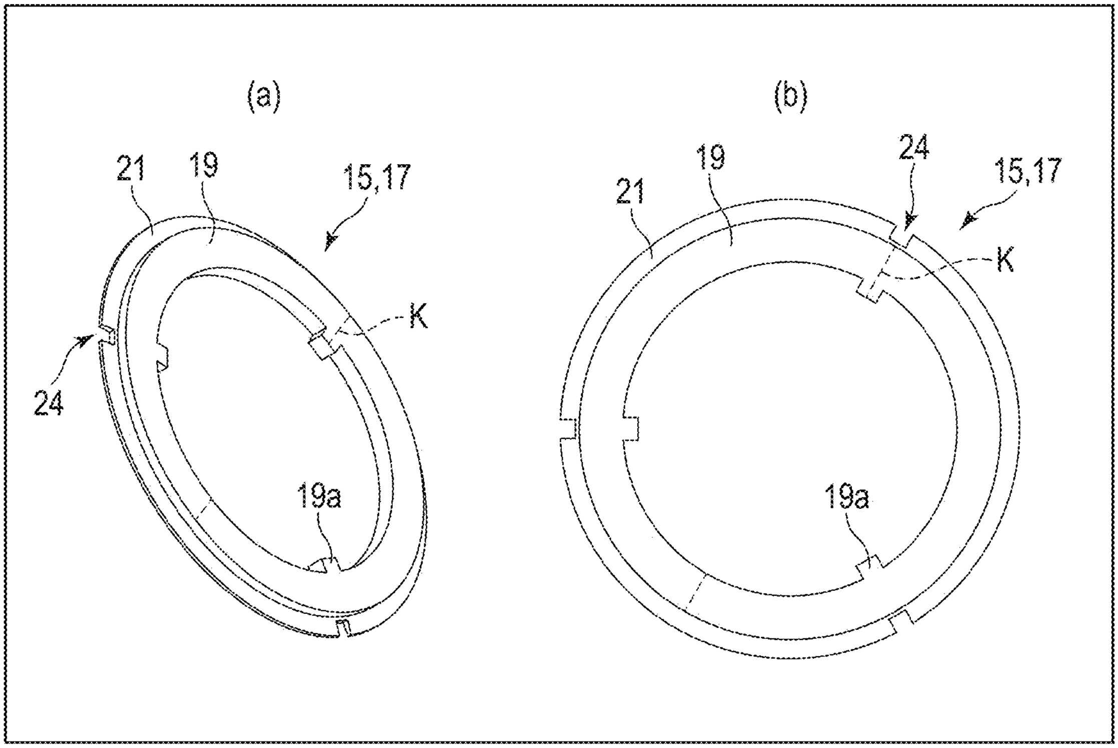
FIG. 10 is a diagram showing one and the other one of welding collars according to the second embodiment, part (a) being a perspective view and part (b) being a front view.

As shown in FIG. 10, in this second embodiment, grooves 24 (FIGS. 10 and 12) are formed in place of the holes 22 (FIGS. 10 and 12) of the one and the other welding collar 15, 17 (FIGS. 10, 12, and 13) in the first embodiment.

The grooves 24 are each formed into a rectangular recess shape, and in this embodiment, three of them grooves are formed at three locations equally spaced apart from each other along the circumferential direction.

Figure 11:
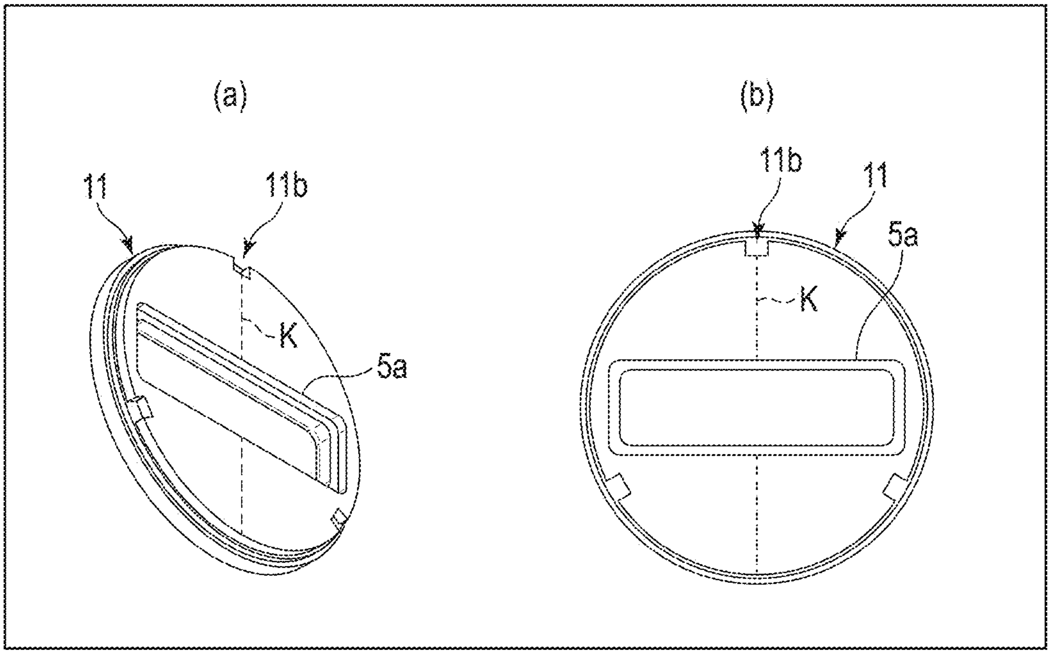
FIG. 11 is a diagram showing the introduction-side connection plate, part (a) being a perspective view, and part (b) being a front view.

As shown in FIG. 11, at least two mark-off lines K (indicated by dashed lines in the figure) are formed on the introduction-side connection plate 11 with respect to the fitting portion 5*a* of the introduction-side rectangular waveguide tube, as in the case of the first embodiment, and one mark-off line is formed at a position corresponding to the fitting recess 11*b*.

Figure 12:
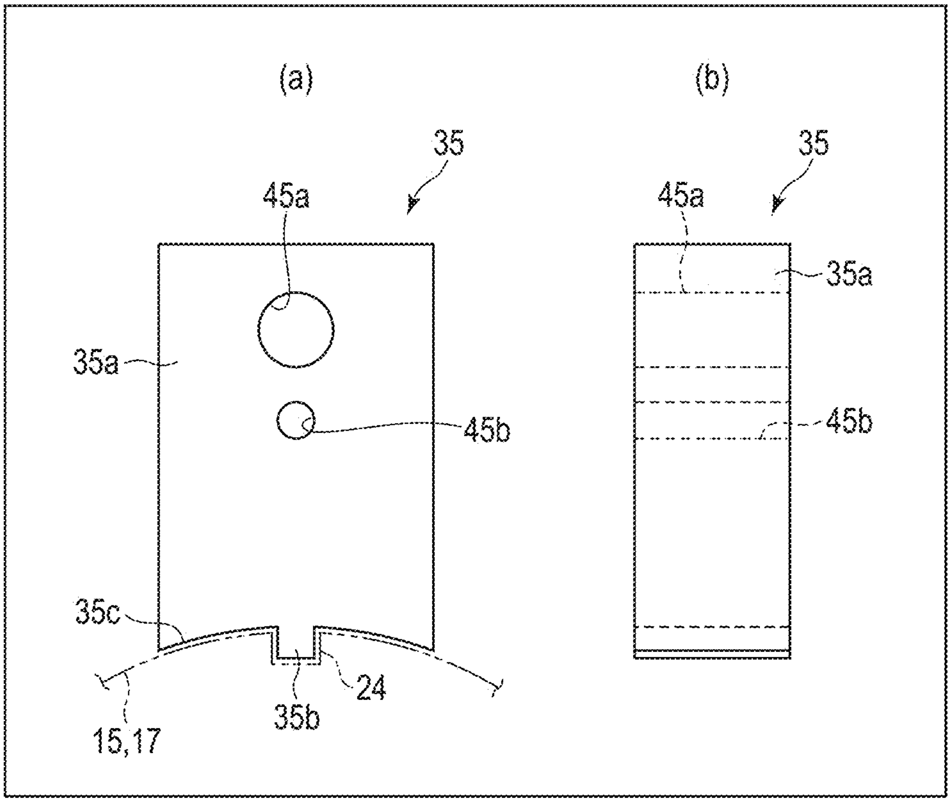
FIG. 12 is a diagram showing a rotation regulation jig according to the second embodiment, part (a) being a front view, and part (b) being a side view.

As shown in FIG. 12, the rotation regulation jig 35 comprises a plate-shaped jig body 35*a* and a fitting projection portion 35*b* that fits into the groove 24. In the jig body 35*a*, an arc-shaped portion 35*c* is formed along the outer circumferences of the welding collar 15 and 17. The fitting projection portion 35*b* is formed to project from the arc-shaped portion 35*c*.

Further, the jig body 35*a* comprises a large-diameter regulation member insertion hole 45*a* through which the middle portion 41*c* (see FIG. 13) of the torque regulation member 41 is inserted and a small-diameter screw shaft insertion hole 45*b* through which the screw shaft 43*a* (see FIG. 13) of the fastening tool 43 is inserted.

Figure 13:
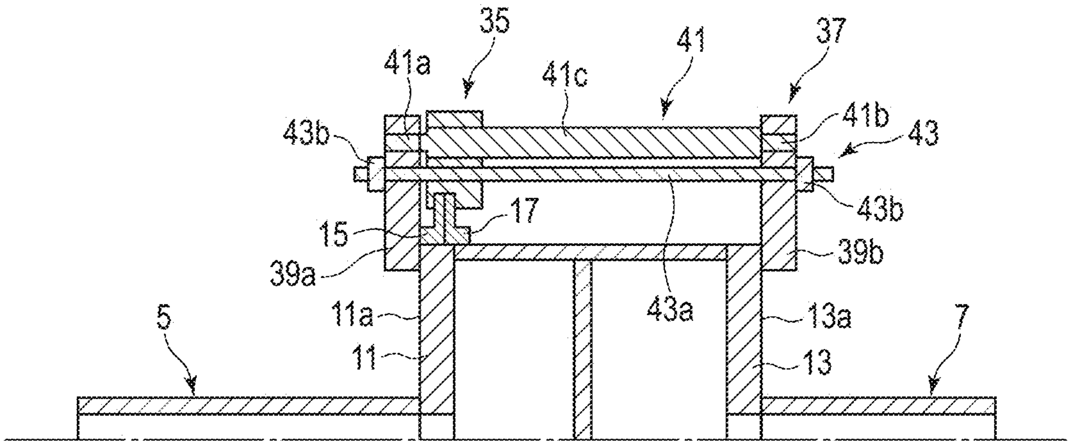
FIG. 13 is a cross-sectional view showing a pillbox window assembly in which the rotation regulation jig of the second embodiment and a torque application jig are installed.

In a method of manufacturing the pillbox window 1, according to the second embodiment, as shown in FIG. 13, one welding collar 15 and the other welding collar 17 are set to overlap each other so that the grooves 24 thereof (see FIG. 10) are aligned with each other, and the fitting projection portions 35*b* of the rotation regulation jig 35 are fitted into the opposing grooves 24 and 24 from the outer circumferential side of the welding collars 15 and 17.

Next, the screw shaft 43*a* is inserted into the screw shaft insertion hole 45*b* (see FIG. 12) of the jig body 35*a*, and the middle portion 41*c* of the torque regulation member 41 is inserted into the regulation member insertion hole 45*a* (see FIG. 12). In the meantime, one holding body 39*a* is placed on the introduction-side surface 11*a* of the introduction-side connection plate 11, and the other holding body 39*b* is placed on the lead-out-side surface 13*a* of the lead-out-side connection plate 13. Then, through the end portions 41*a* and 41*b* of the torque regulation member 41, which correspond to the respective holding bodies 39*a* and 39*b* and the end portion of the screw shaft 43*a*, the shaft is tightened with the nut 43*b*.

Then, as in the first embodiment, the welding collars 15 and 17 are welded together except for the grooves 24 (see FIG. 10) and the surroundings of the grooves (first welding process), and then the torque application jig 37 and the rotation regulation jig 35 are removed from the welding collars 15 and 17 (jig removal process). Thereafter, the grooves 24 (see FIG. 10) and their surroundings of the welding collars 15 and 17 are welded (second welding process).

According to the second embodiment, advantageous effect similar to those of the first embodiment described above can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of holes 22 and grooves 24 formed in the welding collars 15 and 17 is not limited to three, but may as well be formed with any number, such as four or six along the circumferential direction. The shape of the holes 22 is not limited to round, but can be rectangular or hexagonal. Similarly, the grooves 24 are not limited to a rectangle, but may as well be a circular arc.

What is claimed is:

1. A pillbox window, comprising:

a cylindrically shaped circular waveguide tube;

a rectangular cylindrically shaped introduction-side waveguide tube provided at one end of the circular waveguide tube to introduce high-frequency waves from a high frequency source; and a rectangular shaped lead-out-side waveguide tube provided at an other end of the circular waveguide tube to lead out high frequency waves, wherein the circular waveguide tube includes a dielectric hermetic window disposed within the circular waveguide tube, and a first welding collar on an outer circumference of an end surface of at least one of an introduction-side and a lead-out side, which compartmentalizes an inner space into the introduction-side and the lead-out side, the introduction-side rectangular waveguide tube and the lead-out-side rectangular waveguide tube are each connected to a respective circular connection plate connected to an end surface of the circular waveguide tube, and a circular connection plate of the circular connection plates includes, in an outer circumferential portion of the circular connection plate, a second welding collar welded to the first welding collar, and both the first welding collar and the second welding collar comprise grooves or holes for receiving a rotation regulation jig which regulates rotation in a circumferential direction, and an entire portion along the circumferential direction including the grooves or holes is welded and fixed thereto.

2. A method of manufacturing the pillbox window of claim 1, wherein the rotation regulation jig includes a fitting projection portion that fits into the holes or the grooves of the first welding collar and the second welding collar, the method comprising:

a rotation regulation step of fitting the fitting projection portion into the first welding collar and the second welding collar before welding, and fixing the first welding collar and the second welding collar together, thereby relatively regulating rotation thereof in the circumferential direction;

a torque application step of fastening the first welding collar and the second welding collar at a predetermined torque with a torque application jig;

a first welding step of welding portions of the first welding collar and the second welding collar, the portions at which the welding occurs excluding the holes or the grooves of the first and second welding collars, after the rotation regulation step and the torque application step;

a jig removal step of removing the rotation regulation jig and the torque application jig before the first welding step; and a second welding step of welding portions of the holes or the grooves of the one first welding collar and the second welding collar after the jig removal step.

* * * * *